June 11, 1968  L. A. NOWOTNY  3,387,375

TEMPLATE FOR THE GAS CUTTING OF HOLES

Filed June 16, 1967

Inventor
Lloyd A. Nowotny
By Forest C. Sexton
Attorney 3,387,375
TEMPLATE FOR THE GAS CUTTING
OF HOLES
Lloyd A. Nowotny, Milwaukee, Wis., assignor to Allis-Chalmers Manufacturing Company, Milwaukee, Wis.
Filed June 16, 1967, Ser. No. 646,667
4 Claims. (Cl. 33—174)

ABSTRACT OF THE DISCLOSURE

A circular template for use in combination with a template tracing gas cutting machine having an acute sector-shaped indentation in the periphery thereof. A sector-shaped member, having a sector angle smaller than that of the indentation, is pivotally secured therein to provide a small sector shaped slot at one pivot position and another small sector-shaped slot at the other pivot position.

---

This invention relates generally to gas cutting machines of the type having a template following mechanism to guide the cutting torch along the workpiece in a path defined by a template. More specifically, this invention relates to a new and improved circular template to be used in conjunction with such a machine for gas cutting holes.

Gas cutting machines of the character having a template follower are so well known in the prior art that they need not be detailed here. It should be sufficient to say that such machines usually comprise one or more gas cutting torch heads rigidly secured below some sort of movable bridge or double pivot frame structure. A template tracer, usually a motor driven rotating magnetic pin, is also secured to the movable or pivotal frame structure. A template of any desired shape is rigidly fixed in the vicinity of the template traces but independent of the frame structure. In operation, the template tracer drives itself along the edge of the template causing movement of the frame structure so that the torch head or heads secured thereto will each trace and cut the outline of the template against the workpiece.

Such cutting machines as described above have greatly contributed to the gas cutting art by providing a quick and easy way to make reproducible precision cuts. As a result, manufacturing costs have in many instances been greatly reduced by substituting such gas cutting techniques for more costly and time consuming machining operations. In many manufacturing processes, the time savings alone is a very substantial advantage.

In some instances, template tracing gas cutting machines have even replaced the drill press for cutting ordinary holes in plate metal. Although such gas cut holes can be made much faster than ordinary drilled holes, the gas cut holes as a rule leave something to be desired. That is to say, gas cut holes are so far from perfect that they are not acceptable for many applications. To understand why, it must be noted that when an ordinary straight or irregular cut is made across a piece of metal from one edge to another, the cut or kerf is started at the edge of the workpiece. Hence, the torch flame is unobstructed as it starts the cut, and the molten slag can readily be blown from the kerf as soon as a kerf is started. In addition, as the cut is finished, the torch can be advanced beyond the edge of the workpiece so that all the molten slag is blown free before the torch is shut off. Thus, in ordinary applications, a gas torch will produce a neat and smooth cut. On the other hand, when a cut is started within the body of the workpiece, as when a hole is cut, the characteristics of the cut are not as neat and smooth as might be desired. This is because the workpiece itself will obstruct the torch flame until the piece is pierced through, and thus the molten slag will not readily flow from the kerf in line with the desired cut. Therefore, until the torch flame completely pierces through the workpiece, the obstruction will cause the flame to be deflected, and the slag is blown back up through the penetrating cut. As a result, the workpiece is usually severly gouged and pitted at the point where the cut was started. In addition, when the cut is finished within the body of the workpiece, along a previously formed kerf, and the torch is then shut off, a small amount of molten slag may remain in the kerf at the shut-off point.

One solution to the above discussed problem has been to start or finish the cut at a point which is radially inward from the surface of the hole to be cut. That is to say, the metal is pierced at some point near the center of the desired hole. After the workpiece is pierced, the torch will cut smoothly and neatly and can then be advanced outward towards the circumference of the intended hole. Then after the circumference is traced and the hole cut, the torch is moved back inward before it is shut off. By such practices, any cutting irregularities caused by starting or finishing the cut will be contained within the discarded slug and not at the cut surface of the hole. To effect this technique in template tracing machines, circular templates having a radial slot have been employed. In operation, the metal is pierced while the template tracer is within the radial slot. Any gouging or pitting will then be restricted to a point radially inward from the intended hole surface. The template tracer then moves out of the slot and onto periphery of the template, and the desired hole is cut as the tracer traces the periphery of the template. As the cut is completed, the template tracer moves back into the radial slot pulling the torch away from the hole surface. Once the torch has moved away from the hole surface, it can be shut off and any slag not blown from the kerf will be contained within the slug radially inward from the circular hole surface.

Although the template as described above has greatly improved the characteristics of gas cut holes, there still remains disadvantages to such holes as compared to drilled holes. Specifically, there is usually a small metal protrusion or peak on the cut hole surface at the point where the torch moves into and away from the periphery of the cut. This is because the radial slot in the circular template must, of course, be slightly wider than the diameter of the template tracer, so that the tracer may freely move along its surfaces. Therefore, the tracer moves outward on one surface of the slot and inward on the other surface so that the tracer and torch trace a path which is slightly less than a complete 360 degrees.

Summary of the invention

This invention is predicated upon my conception and development of a new and improved hole cutting template wherein the radial slot is shifted after the template tracer emerges therefrom so that the template tracer, and accordingly the torch, will travel a circular or peripheral path which is greater than 360 degrees. The movable slot is effected by providing a sliding or pivotal sector as a part of the template which can provide two different radial slots for the template tracer more than 360 degrees apart.

*Description of the preferred embodiments*

Broadly, the template of this invention comprises a fixed, first member having a peripheral configuration substantially the same as that of the desired hole to be cut but further having an indentation along a portion of the periphery and a pivotal second member pivotally secured within said indentation. The second member is free to pivot arcuately within the indentation to provide a smaller indentation or slot at either end thereof.

Figure 1:
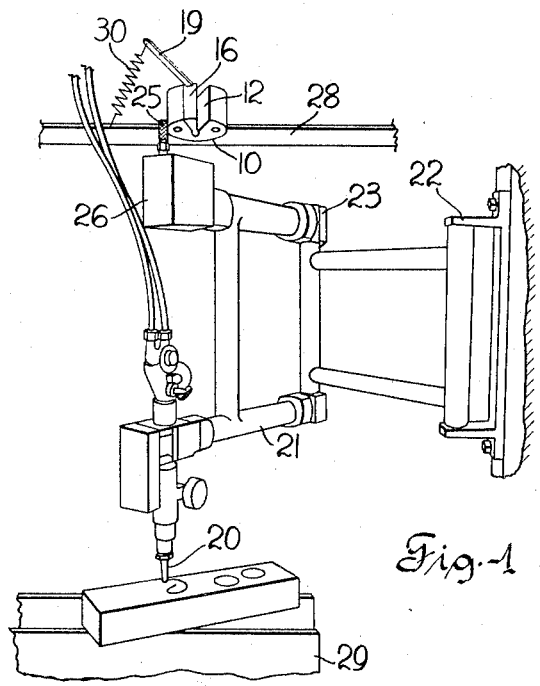
FIG. 1 is a perspective view of typical template following gas cutting machine with a template of this invention incorporated therewith.
Figure 2:
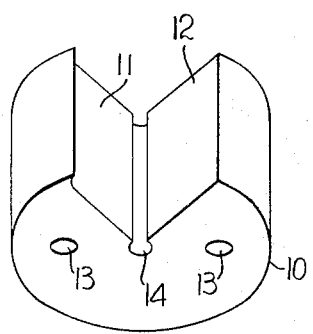
FIG. 2 is a perspective view of the fixed portion of the template of this invention.

Referring to the drawings, the main body or first member 10 of the template comprises a fixed disk or cylinder from which an acute sector has been cut. Thus, the cross-sectional geometry of this first member 10 is that of an obtuse sector (see FIG. 2). At least one bolt hole 13 should be provided through this first member 10 so that it may be secured to the template holding arm 28 of the gas cutting machine as shown in FIG. 1. In the embodiment shown, a second hole 14 is provided at the axis of the first member 10. It should be noted that this hole 14, if provided, must intersect the flat radial surfaces 11 and 12.

Figure 3:
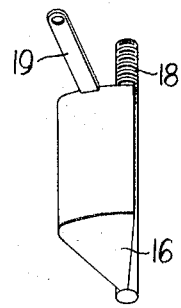
FIG. 3 is a perspective view of the pivotal portion of the template to be fitted with that portion shown in FIG. 2.

A second member 16 is also provided having, at least in part, a cross-sectional configuration of an acute sector, but with a sector angle substantially smaller than that cut from the first member 10 (see FIG. 3). A cylindrical pin 18, having a threaded extension on the upper end thereof, is rigidly secured to the second member 16 so that the axis of the pin coincides with the axis of the sector arc. The diameter of the pin 18 should be such that the pin can easily fit and rotate within hole 14 through the axis of first member 10. In addition to the pin 18, the second member 16 may also be provided with a lever arm 19 secured at some point away from the lower surface thereof.

FIG. 1 illustrates one of the many types of template tracing cutting machines with which this invention can be incorporated. The cutting torch 20 is rigidly secured to a frame structure 21 which can freely pivot at hinge 22 and elbow 23. Then the torch head can be moved freely within a defined plane. The template tracer 25 is positioned directly above the torch 20. A small electric motor, enclosed in box 26, slowly rotates the template tracer 25 causing it to be driven along the periphery of any template secured to template arm 28.

To assemble the template of this invention, the first member 10 is rigidly secured to the cutting machine template arm 28 by any suitable means provided the lower periphery thereof is not obstructed. In the embodiment shown, this can easily be done by providing screws or bolts through holes 13. The threaded extension of pin 18 on second member 16 is then inserted up through hole 14 so that the sector-shaped portion of second member 16 fits completely within the acute sector-shaped cut in first member 10. Second member 16 is secured therein by any means such as by a nut on the threaded end of pin 18. Second member 16 must be so secured that its lower surface is substantially even with the lower surface of the first member 10, and so that it can freely pivot between surfaces 11 and 12. A relatively weak spring 30, acting on lever arm 20 must then bias second member 16 against face 11 on first member 10.

Figure 4:
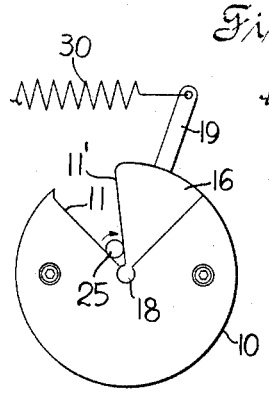
FIG. 4 is a plan view of the complete template with the template tracer in the position for starting the cut.
Figure 5:
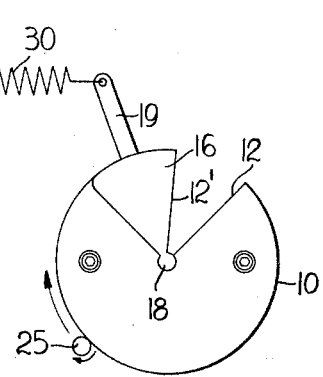
FIG. 5 is a plan view like that of FIG. 4 wherein the template tracer is in a position about midway through the cut and the pivotal portion of the template has pivoted to the finishing position.

In operation, the workpiece is placed on the cutting machine bed 29 with the desired hole location directly under the template. The second member 16 of the template is then pivoted away from face 11 and against face 12. The template tracer 25 is then inserted into the sector-shaped opening between second member 16 and face 11 as shown in FIG. 4. The torch 20 should be started and the workpiece pierced while the machine is in this position. When the workpiece is pierced, the template tracer 25 can be started allowing it to roll radially outward along the flat face 11' of second member 16 and then out onto the circumferential periphery thereof. The torch 20 will of course cut an identical path in the workpiece therebelow. When the template tracer 25 rolls from the circumferential surface of member 16 and onto the adjoining circumferential surface of first member 10, the spring 30 will pivot second member 16 back against face 11. The template tracer 25 will continue to roll along the circumference of first member 10 and subsequently back onto the circumferential surface of second member 16, and then radially inward along the flat surface 12' thereof opposite face 12. At this point, the hole is completely and smoothly cut, and the torch can be shut off. It should be apparent from FIGS. 3 and 4 that the torch 20 will travel a circular path of more than 360 degrees so that no protrusion or slag will remain on the cut hole surface.

Although it is obvious that many modifications and different embodiments of this invention could be employed, it should be further apparent that certain other requirements must be maintained. One requirement is that the radii of the peripheral arcs on the two members must, of course, be equal so that the peripheral arc of one member will be contiguous with the peripheral arc of the other at either pivot position. Another requirement is that the acute sector angle of second member 16 must be more than half of the acute sector angle cut from first member 10. That is to say, the acute angle between faces 11' and 12' must be substantially less than but more than half of the acute angle between faces 11 and 12. This is necessary so that there will be a sufficient slot within which to insert template tracer 25 and so that the template tracer 25, and accordingly the torch 20, will travel a circular path of more than 360 degrees. Of course, if the template is not circular, the same principle can easily be applied by making the traceable periphery of the second member substantially smaller than but more than half the width of the indentation. Still another requirement is that in the embodiment shown, the tension spring 30 must be weak so that second member 16 is not pivoted prematurely. Although the pivotal axis of second member 16 must coincide with the axis of first member 10, the radial faces need not be flat or exact radii. It is sufficient that the peripheral arcs of each member abut tangentially at each pivot position.

Obviously, there are other embodiments that could be employed without departing from the basic concept of this invention. For example, it should be obvious that the second member 16 and the indentation in which it is fitted need not be sector shaped. Any shape could be utilized provided they present contiguous abutting segments at the periphery. In addition, the second member need not extend to the axis of the template provided it is free to pivot or slide about the axis point. Furthermore, the second member 16 and the indentation need not extend through the entire height of the first member 10 provided there is sufficient clearance for the template tracer 25. In other embodiments, the spring 30 could be omitted and the second member 16 pivoted manually or by some other body in motion such as the tracer 25. This would alleviate the problem of a premature pivot of second member 16. There are also many other systems by which the pivotal member 16 could be pivotally hinged or secured to first member 10. For example, second member 16 could be slidably secured within arcuate grooves. In still another embodiment, the lower portion of pin 18 could be removed and the lower portion of faces 11' and 12' on second member 16 and the lower portion of faces 11 and 12 on first member 10 could be somewhat recessed so that the template tracer 25 could be started at the exact center of the circular template. This would facilitate the proper placement of the workpiece since the exact center of the desired hole could be aligned with the torch.

It is also obvious that the template could be modified to cut nonround holes such as eliptical, oval or even rectangular holes. In the event of a rectangular template for cutting rectangular holes, the second member 16 would not pivot about an axis but rather could comprise a sliding block within an indentation on one side of the rectangular first member.

The embodiments of the invention in which an exclusive property or privilege is claimed are defined as follows:

1. A hole cutting template for use in combination with a template tracing gas cutting machine comprising a fixed first member having a lateral periphery, said lateral periphery comprising a first traceable portion of substantially the shape of a segment of a hole to be cut and a second portion formed by an indentation in the lateral periphery of said first member; and a second member secured to slide within said indentation between two extreme positions, said second member having a lateral periphery comprising a traceable portion of substantially the shape of another segment of the periphery of a hole to be cut, an end of the traceable portion of the periphery thereof coinciding with an end of the traceable portion of the periphery of said first member at said extreme slide positions to more closely match the periphery of the desired hole to be cut, the traceable portion of said second member having a length substantially shorter than but more than half of the distance between said extreme positions so that said second member is free to slide within said indentation to leave a portion of the indentation open at either end of said second member.

2. A hole cutting template according to claim 1 wherein said second member is pivotally secured within said indentation so that said second member is free to pivot within said indentation.

3. A hole cutting template according to claim 2 wherein said traceable portions lie substantially in a circle.

4. A hole cutting template according to claim 3 wherein said indentation and said second member are each substantially sector shaped with the sector angle of said second member being substantially smaller than the sector angle of said indentation.

References Cited
UNITED STATES PATENTS 2,190,360   2/1940   Howard _____ 33—234 X
2,388,555   11/1945   Kuehni _____ 33—234 X SAMUEL S. MATTHEWS, *Primary Examiner.*